United States Patent [19]
Dertouzos et al.

[11] 4,067,017
[45] Jan. 3, 1978

[54] PARALLEL THERMAL PRINTER

[75] Inventors: Michael L. Dertouzos, Newton, Mass.; Huber L. Graham, Bath, Pa.

[73] Assignee: Michael L. Dertouzos, Newton, Mass.

[21] Appl. No.: 728,167

[22] Filed: Sept. 30, 1976

Related U.S. Application Data

[63] Continuation of Ser. No. 633,913, Nov. 20, 1975, Pat. No. 3,984,809.

[51] Int. Cl.² .................................................. G01D 9/28
[52] U.S. Cl. .................................... 346/46; 346/76 R
[58] Field of Search ............... 346/46, 50, 76 R, 136, 346/139 C; 219/216

[56] References Cited
U.S. PATENT DOCUMENTS

| | | | |
|---|---|---|---|
| 2,897,037 | 7/1959 | Tolf | 346/46 UX |
| 3,523,158 | 8/1970 | Zaphiropoules | 346/46 UX |
| 3,632,969 | 1/1972 | Walkow | 346/76 R X |
| 3,792,481 | 2/1974 | Nagashima et al. | 346/76 R X |

*Primary Examiner*—George H. Miller, Jr.
*Attorney, Agent, or Firm*—Morse, Altman, Oates & Bello

[57] ABSTRACT

Visual indicia or patterns are produced as each of the successive increments extending across a continuously advancing web of paper or fabric is imprinted with a series of visual dots from a sheet or ribbon containing a visual medium by at least one closely packed series of elements that are selected instantly by electronic logic, energized simultaneously by electrical pulses, and recycled rapidly by a common electrical and thermal bus. Specified parameters have been found to combine rapid advancement of the web and close packing of the visual dots.

5 Claims, 6 Drawing Figures

PARALLEL THERMAL PRINTER

This is a continuation of application Ser. No. 633,913 filed on Nov. 20, 1975, now U.S. Pat. No. 3,984,809.

BACKGROUND

1. Field of the Invention

The present invention relates to thermography, namely, the printing of visual matter by means of heat, and, more particularly, to the formation of visual matter in terms of visual dots transferred to a paper or textile web from a pigment or dye carrier under the control of an array of thermal elements.

2. The Prior Art

A variety of systems have been proposed in which individual thermal elements produce indicia or patterns on a web in response to readout commands. In one such system, typified by U.S. Pat. No. 3,815,144, June 4, 1974, in the name of Howard H. Aiken for Thermal Recorder Having An Analogue To Digital Converter, an array of thermal elements produce visual matter directly on thermally sensitive paper. In another such system, typified by U.S. Pat. No. 3,596,055, July 27, 1971, in the name of William A. Elston for Method And Apparatus For Producing Displays Utilizing An Electronic Display System, an array of thermal elements produce visual matter by transfer of a visual medium from a carrier to ordinary paper or the like. Such thermal systems contrast with mechanical impact systems, which tend to be less adapted to meet special readout requirements, particularly, very high speed and unusual versality. In connection with such thermal systems, it is desired to increase speed and improve versatility without adversely affecting reliability or unduly increasing cost.

SUMMARY OF THE INVENTION

The object of the present invention is to provide an improved thermal printer, in which indicia or patterns are imparted to a rapidly advancing web of paper or fabric from a contiguously moving sheet or ribbon containing a visual medium, under the control of at least one series of thermal elements extending across the web, associated logic circuitry for selecting thermal elements instantaneously in comparison with web speed, associated power circuits for energizing selected thermal elements simultaneously, and a common conducting bus acting both as an electrical and thermal ground. Significant parameters have been found in the geometrical and electrical characteristics of the thermal elements and their relationships to the other components of the system.

Other objects of the present invention will in part be obvious and will in part appear hereinafter.

The invention accordingly comprises the systems disclosed herein, together with their components and their interrelationships, the scope of which will be indicated in the appended claims.

BRIEF DESCRIPTION OF THE DRAWINGS

For a fuller understanding of the nature and objects of the present invention, reference is made to the following detailed specification, which is to be taken with the accompanying drawings, wherein.

DETAILED DESCRIPTION OF THE EMBODIMENT OF FIGS. 1, 2, 3, 5 AND 6

Figure 1:
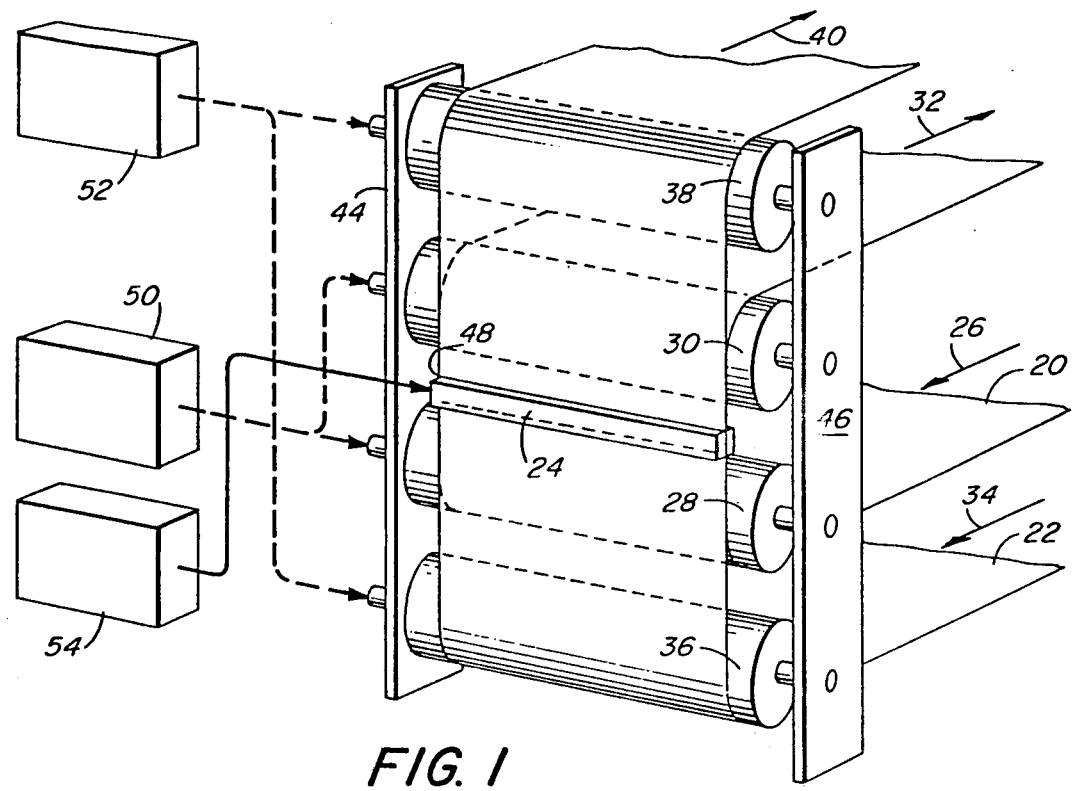
FIG. 1 is a general view, partly perspective and partly schematic, of a preferred system embodying the present invention.

In the printing system of FIG. 1, indicia or patterns are imparted to a rapidly advancing web sheet 20 of paper or fabric from a contiguously moving carrier sheet 22 containing a visual medium, under the control of an elongated assemblage 24 of thermal elements extending across sheet 22. As shown, web sheet 20 advances from a supply 26 into contact with a pair of drive rollers 28, 30 and to a take-up 32. Carrier sheet 22 advances from a supply 34 past a drive roll 36 into contact with web sheet 20 in contiguity with rollers 28, 30, and past a drive roll 38 to a take-up 40. The paths of web sheets 20 and carrier sheet 22 extend through a region between rolls 28, 30, at which the web sheet and the carrier sheet are pressed together throughout their widths between assemblage 24 and a backing plate 42. Rolls 28, 30, 36, 38, which are associated with auxilliary drive rolls (omitted for clarity), are rotatably mounted on support brackets 44, 46. Assemblage 24 and backing plate are mounted on brackets 44, 46 by pivots (not shown for clarity), which permit them to be opened from each other about an axis at 48 to permit threading of the web sheet and the carrier therebetween and which is associated with an adjustable biasing spring that normally presses them toward each other so that they exert predetermined pressure. Rolls 28, 30 are driven by a variable speed motor 50 and rolls 36, 38 are driven by a variable speed motor 52. In one mode of operation the speed of rolls 36, 38 is greater than the speed of rolls 28, 30, all of the rolls being of the same diameter. Thermal element series 24 is driven by a power supply and control circuit 54 in a manner now to be described.

Figure 2:
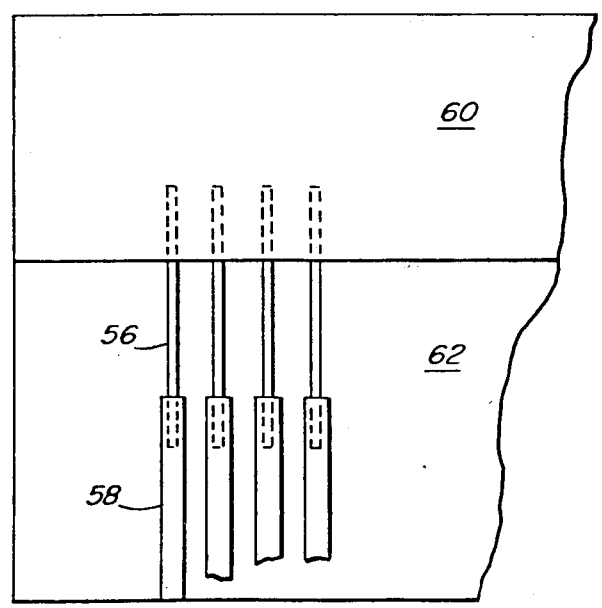
FIG. 2 is a plan view, partly broken away, of a component of the systems of FIGS. 1 and 4.
Figure 3:
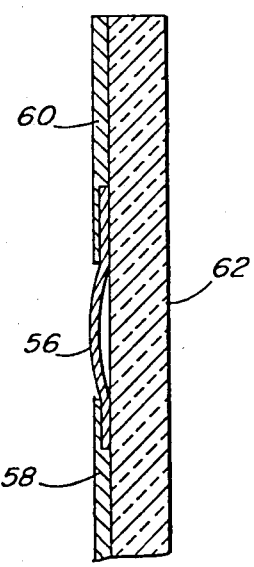
FIG. 3 is a cross-sectional view of the component of FIG. 2, the section being taken substantially along the line 2—2.
Figure 5:
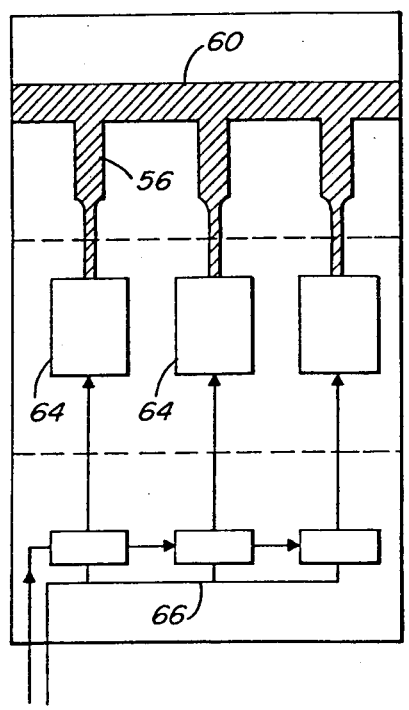
FIG. 5 is an electrical schematic diagram of a component of the systems of FIGS. 1 and 4.
Figure 6:
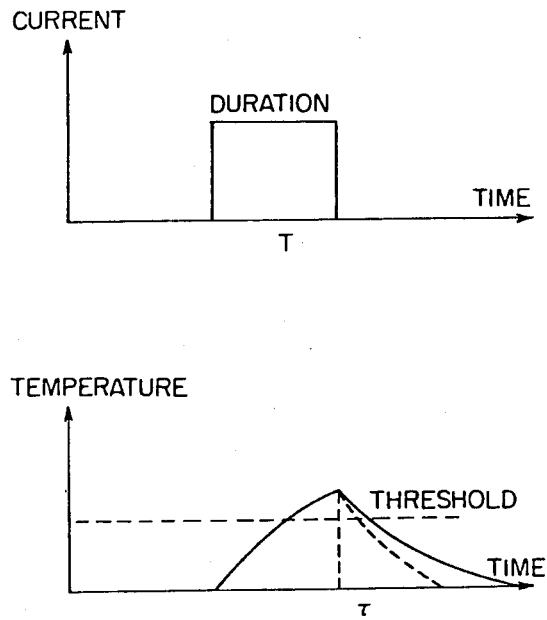
FIG. 6 graphically illustrates certain principles of the present invention.

As shown in FIGS. 2 and 3, assemblage 24 includes a series of elongated thermal elements 56 extending along the direction of travel of web sheet 20 and perpendicular to the direction of elongation of assemblage 24. Each of these thermal elements is electrically connected at one end to a terminal 58 and at the other end to a bus 60, all of the elements being mounted on a non-conducting support 62. In one form, thermal elements 56 are composed of a high resistance metal or metal alloy such as tantalum or nichrome, conductors 58 and bus 60 are composed of a low resistance metal such as silver or copper and support 62 is composed of a thermoset plastic such as phenol formaldehyde and epoxy resin. In another form, thermal elements 56 are composed of a vapor deposited resistive semi-conductor such as doped silicon, bus 60 is composed of a vapor deposited metal such as copper and support 62 is composed of an insulative semiconductor such as a silicon substrate. Each heating element protrudes outwardly from support 62. As shown in FIG. 5, within assemblage 24, the thermal elements are powered by a series of drivers 64 under the control of a shift register 66. The arrangement is such that at successive times under synchronized timing signals from control 54, selected thermal elements 56 are energized by electrical pulses of the rectangular waveform shown in FIG. 6A. During each pulse, current passes through selected terminals 58 and selected thermal elements 58 to bus 60, which operates as an electrical return and as a heat sink, the thermal change of each thermal element 58 being indicated in FIG. 6B. The arrangement is such that a predetermined quantity of heat generated by a given pulse is dissipated by the heat sink before the occurrence of the next pulse so that a bias temperature level is established.

In accordance with the present invention, best results are achieved under the following conditions:

|  | Range |
| --- | --- |
| Thickness of each of thermal element | 0.001 to 0.01 inch |
| Width of each of thermal elements | 0.002 to 0.020 inch |
| Length of each of thermal elements | 0.010 to 0.100 inch |
| Center-to-center spacing of thermal elements | 0.002 to 0.050 inch |
| Voltage of each drive pulse | 0.02 to .50 volts |
| Current to each drive pulse | 1 to 10 amps |
| Resistance of each thermal element | 0.01 to 0.50 ohms |
| Duration of each drive pulse | 100 microseconds to 100 milliseconds |
| Power of each pulse | 0.05 to 0.50 watt |
| Energy of each pulse | 1 to 50 millijoules |
| Elapsed time between pulses | Between 1 and 20 times larger than pulse duration |
| Web sheet speed | 0.1 to 10 inches per second |
| Pressure between thermal element assemblage and backing plate | 0.1 to 10 grams per square centimeter |

Figure 4:
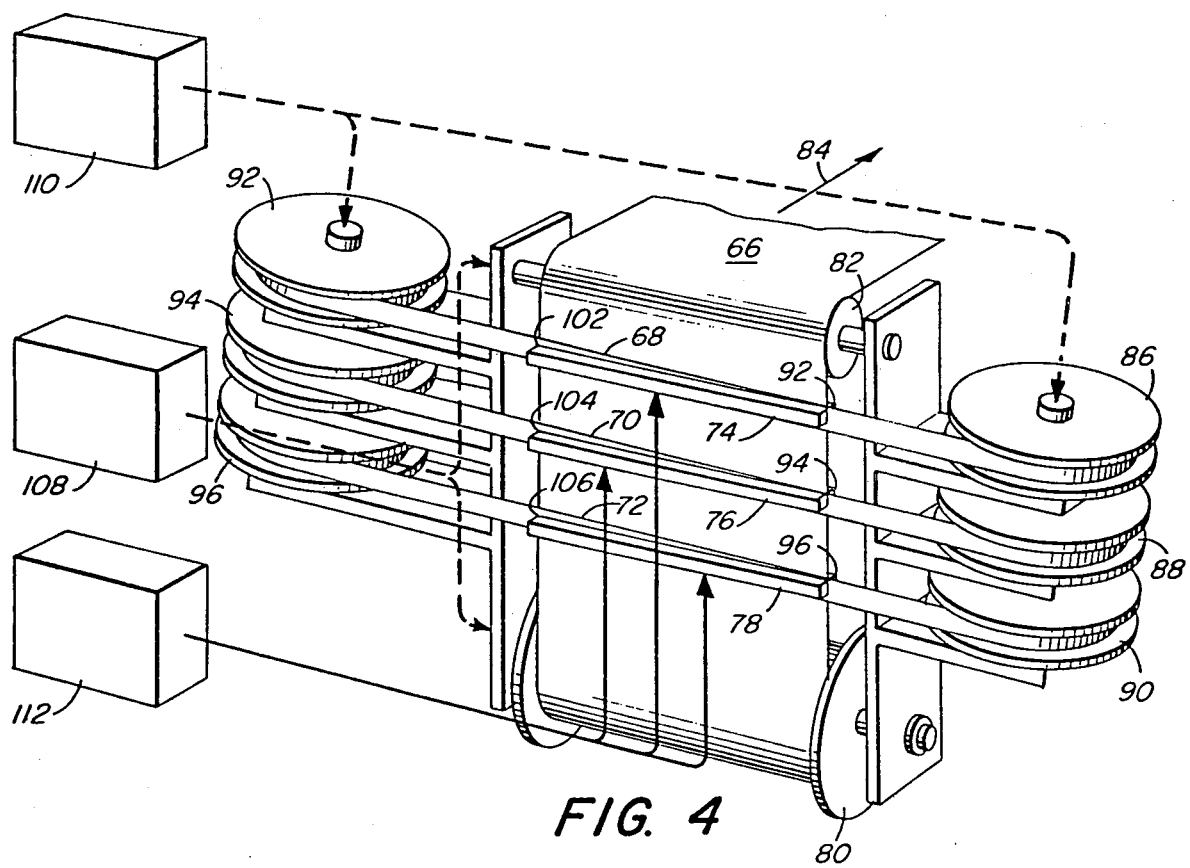
FIG. 4 is a general view, partly perspective and partly schematic, of another preferred system embodying the present invention.

In the printing system of FIG. 4, multicolor indicia or patterns are imparted to a rapidly advancing web sheet 66 of paper or fabric from red, green, and blue carrier ribbons 68, 70, 72, under the respective control of three elongated assemblages 74, 76, 78 of thermal elements extending across web sheet 66. As shown, web sheet 66 advances from a supply roll 80, past a drive roll 82 to a take-up 84. The direction of advancement of web sheet 66 is perpendicular to the direction of elongation of assemblages 74, 76, 78. Carrier ribbons 68, 70, 72 extend from supply spools 86, 88, 90, respectively, to take-up spools 92, 94, 96, respectively. The paths of web sheet 66 and ribbons 68, 70, 72 extend through spaced regions at which the ribbons are pressed into contact with the web sheet entirely across its width between assemblages 74, 76, 78 and three backing plates in respective registration therewith. Rolls 80 and 82, which are associated with auxilliary guide and drive rolls (omitted for clarity) are rotatably mounted on brackets 98, 100.

Assemblages 74, 76, 78 and backing plates 92, 94, 96 are mounted on brackets 98, 100 by pivots (not shown for clarity), which permit them to be opened from each other about axes 102, 104, 106 to permit threading of the web sheet and the carrier ribbons therebetween and which are associated with adjustable biasing springs that normally press them toward each other so that they exert predetermined pressure. Rolls 80, 82 are driven by a variable speed motor 108 and spools 86, 88, 90 and 92, 94, 96 are driven by a variable speed motor 110. Thermal element assemblages 74, 76, 78 are driven by a power supply and control circuit 112. It will be observed that ribbons 68, 70, 72 are oblique with respect to assemblages 74, 76, 78 so that the individual thermal elements are spaced at closely packed, successive positions transversely of the tapes and are exposed to fresh positions on the tapes as they advance. Each of assemblages 74, 76, 78 and their thermal elements conductors, busses, drivers, shift registers, and their interrelationships are identical to assemblage 24 and its thermal elements, conductors, busses, drivers, shift registers, and their interrelationships.

OPERATION

Generally, each of carrier sheet 22 and carrier ribbons 68, 70, 72 is in the form of polymeric substrate ranging from 1 to 5 mils thick, and pigment or dye coating thereon for direct contact with web sheet 20 or web sheet 66. Preferably in FIG. 1, web carrier 22 moves more slowly than web sheet 20 in order to ensure utilization of as much of its pigment or dye as possible. Because no pigment or dye transfer occurs merely because of the light pressure exerted between the thermal element assemblages and the associated backing plates, the only points marked on the web sheets are at the intended positions. In accordance with the present invention, a typical carrier sheet or ribbon includes a one mil thick polyethylene terephthalate ribbon on which is deposited a dye such as that sold by DuPont under the trade designation Latyl or Dyblin.

Since certain changes may be made in the above disclosure without departing from the scope of the invention herein, it is intended that all matter described in the foregoing specification or shown in the accompanying drawings be interpreted in an illustrative and not in a limiting sense.

What is claimed is:

1. A thermal printer comprising:
   a. means for continuous advancement of a visual medium receptive web;
   b. means for continuous advancement of a plurality of visual medium carrier webs of different colors;
   c. a plurality of elongated thermal element assemblages extending entirely across said visual medium receptive web;
   d. each of said thermal element assemblages comprising a series of elongated thermal elements;
   e. the direction of elongation of said thermal elements being transverse with respect to the direction of elongation of said thermal element assemblages;
   f. a plurality of common bus means and a plurality of individual terminal means, one extremity of each of said thermal elements being connected to one each of said bus means, the other extremity of each of said thermal elements being connected to one each of said terminal means, said plurality of bus means serving as electrical grounds and as thermal heat sinks;
   g. selection means for selecting certain of said thermal elements;
   h. drive means for energizing said certain of said thermal elements; and
   i. clock means for recycling said selection means and said drive means.

2. The thermal printer of claim 1 wherein each of said thermal elements ranges in width from 0.002 to 0.020 inch, ranges in length from 0.010 to 0.100 inch, and ranges in center-to-center spacing from 0.010 to 0.050 inch.

3. The thermal printer of claim 1 wherein each drive pulse applied to each of said thermal elements ranges in electromotive force from 0.02 to 0.10 volts, ranges in current from 1 to 6 amps, ranges in resistance from 0.01 to 0.50 ohms and ranges in duration from 100 microseconds to 100 milliseconds and the elapsed time between pulses ranges between 1 and 20 times the pulse duration.

4. The thermal printer of claim 1 wherein the web sheet speed ranges from 0.5 to 10 inches per second.

5. The thermal printer of claim 1 wherein each of said thermal element assemblages bears against one each of said visual medium carrier webs and said web sheet at a pressure ranging from 0.1 to 10 grams per square centimeter.

* * * * *